United States Patent [19]

Eckert

[11] Patent Number: 4,809,183
[45] Date of Patent: Feb. 28, 1989

[54] SPEED CONTROL SYSTEM FOR MOTOR VEHICLES OPERATING IN A CURVED PATH

[75] Inventor: Konrad Eckert, Stuttgart, Fed. Rep. of Germany

[73] Assignee: Robert Bosch GmbH, Stuttgart, Fed. Rep. of Germany

[21] Appl. No.: 18,622

[22] Filed: Feb. 25, 1987

[30] Foreign Application Priority Data

Mar. 1, 1986 [DE] Fed. Rep. of Germany ....... 3606797

[51] Int. Cl.$^4$ .......................... B60K 31/00; B60T 8/32
[52] U.S. Cl. ........................... 364/426.04; 364/426.02; 180/170; 180/197; 303/95
[58] Field of Search ................... 364/426, 431.07, 424; 180/170–172, 197, 282; 303/96, 111, 95, 105, 99; 280/707, 772

[56] References Cited

U.S. PATENT DOCUMENTS

| | | | |
|---|---|---|---|
| 3,719,246 | 3/1973 | Bott | 180/197 |
| 3,977,694 | 8/1976 | Nordstorm | 280/112 A |
| 4,042,059 | 8/1977 | Bertolasi | 364/426 X |
| 4,043,608 | 8/1977 | Bourg et al. | 364/426 X |
| 4,484,280 | 11/1984 | Brugger et al. | 180/197 X |
| 4,621,833 | 11/1986 | Soltis | 280/707 |
| 4,640,557 | 2/1987 | Panizza et al. | 303/111 X |
| 4,658,939 | 4/1987 | Kircher et al. | 180/197 X |
| 4,670,845 | 6/1987 | Etoh | 364/426 X |
| 4,693,493 | 9/1987 | Gkemoto et al. | 280/772 X |
| 4,712,807 | 12/1987 | Kurosawa | 280/707 |

Primary Examiner—Gary Chin
Attorney, Agent, or Firm—Frishauf, Holtz, Goodman & Woodward

[57] ABSTRACT

To prevent slip-out or slide-out of a vehicle operating in a curve, the lateral stability or, respectively, instability of the vehicle is determined and, if instability or incipient instability is sensed, the vehicle is automatically braked, and/or engine torque of the vehicle engine is reduced. A reference parameter K, which may be variable in accordance with vehicle operating and operation conditions, is compared with a quotient of change of lateral forces applied to the front (V) and hind or rear (H) axles with respect to the change of the slip angle ($\delta_V$, $\delta_H$), and if the change of lateral force ($\Delta_S/\Delta_\delta$) at the respective axles, and passes the reference K. The respective axles can then be together or selectively braked in accordance with the extent of deviation from said comparison reference K and/or engine torque also reduced.

25 Claims, 3 Drawing Sheets

SPEED CONTROL SYSTEM FOR MOTOR VEHICLES OPERATING IN A CURVED PATH

The present invention relates to a control system to control the speed of a motor vehicle which is operating in a curved path, and more particularly to automatically reduce drive torque applied by the wheels of the vehicle to the road surface if critical parameters of vehicle operation in the curved path occur.

BACKGROUND

If a vehicle operates in a curved path, a centrifugal force $F_{ZF}$ will act thereon in accordance with the relationship $$F_{ZF} = \frac{mv^2}{r} \quad (r = \text{const}) \tag{1}$$

wherein m is the mass of the vehicle, v is the speed of the vehicle and r is the radius of the curved path in which the vehicle operates. A force acting laterally on the vehicle is transferred via the tires of the vehicle on the road surface. "Road surface" as used herein may mean the actual road surface or any other operating surface, for example snow or surface deposits on a road. Additional force components besides the centrifugal force are transferred between wheel and road surface, for example laterally applicable force components due to wind, inclination of the vehicle, and the like. The force components at the forward and rear or hind axle are usually different, depending on the distribution of axle loading of the specific vehicle.

If the lateral force transferred by a wheel to the road surface exceeds a limiting value, instability of vehicle operation will result. The vehicle slips or slides out laterally and the operator loses control over the vehicle.

THE INVENTION

It is an object to improve the stability or operation of a vehicle operating in a curved path and to prevent instability of operation and loss of control by the operator.

Briefly, means are provided on the vehicle to sense lateral forces, both as applied to the front axle and to the rear or hind axle. Change in the application of lateral forces, that is, the derivative of the forces with respect to time, is derived or sensed. The angle of lateral wheel slip, or or turning slip, $\delta$, more specifically $\delta_V$ and $\delta_H$ for, respectively, the front and hind wheels, as well as the change in the lateral wheel slip or turn slip angle with respect to a commanded path are determined.

A quotient is then calculated based on the change of lateral forces and change of angle of lateral slip for at least one of the front or rear wheels, respectively, and the so-derived at least one quotient is compared with a predetermined value, based, for example, empirically on vehicle characteristics. If the predetermined value is exceeded, negatively or positively, or, for short, is passed, e.g. below its value, the speed of the vehicle is reduced. Reduction of vehicle speed can be obtained by for example reducing the amount of fuel being supplied so that engine braking will take effect and/or applying brakes to one or all of the wheels, for example under control of an anti-wheel brake locking system (ABS), which may be of any standard and suitable construction. In other words, if an ABS is present, it can be energized to provide, in accordance with its characteristics, braking effort on one or all of the wheels.

The system, thus, tends to reduce vehicle speed if instability of the wheels of at least one of the axles is sensed or a tendency to instability is sensed. The tendency to instability can be determined by suitably setting the comparison value, for example at a level related to incipient instability. Stable and controlled operation of the vehicle in a curve is thus obtained. Reduction of speed is obtained selectively or in combination by reducing, for example, engine torque by reduction of fuel, change of ignition timing or the like, and/or application of brakes. Of course, combination effects may be used. The degree of braking can be controlled directly in relation to the degree of difference of the calculated quotient from the predetermined reference value. It is readily possible, also, to apply brakes only to one of the axles, for example the one which does not show instability, so that optimum control over the vehicle is retained. Preferably, braking is combined with an ABS control, that is, braking is carried out under controlled conditions which inhibit slippage or wheel blocking.

The predetermined reference value, hereinafter referred to as reference K, may be a variable value, depending on conditions of the vehicle and characteristics thereof, as well as, for example, on external, for example road conditions. Further, the reference value K can be changed in dependence on the operating mode selected to reduce vehicle speed. For example, if only engine braking is used, that is, reduction of motor torque, the reference threshold level can be selected to be lower than when brakes are applied or, especially, when motor torque is reduced and the brakes are applied.

DRAWINGS

DETAILED DESCRIPTION

Figure 1:
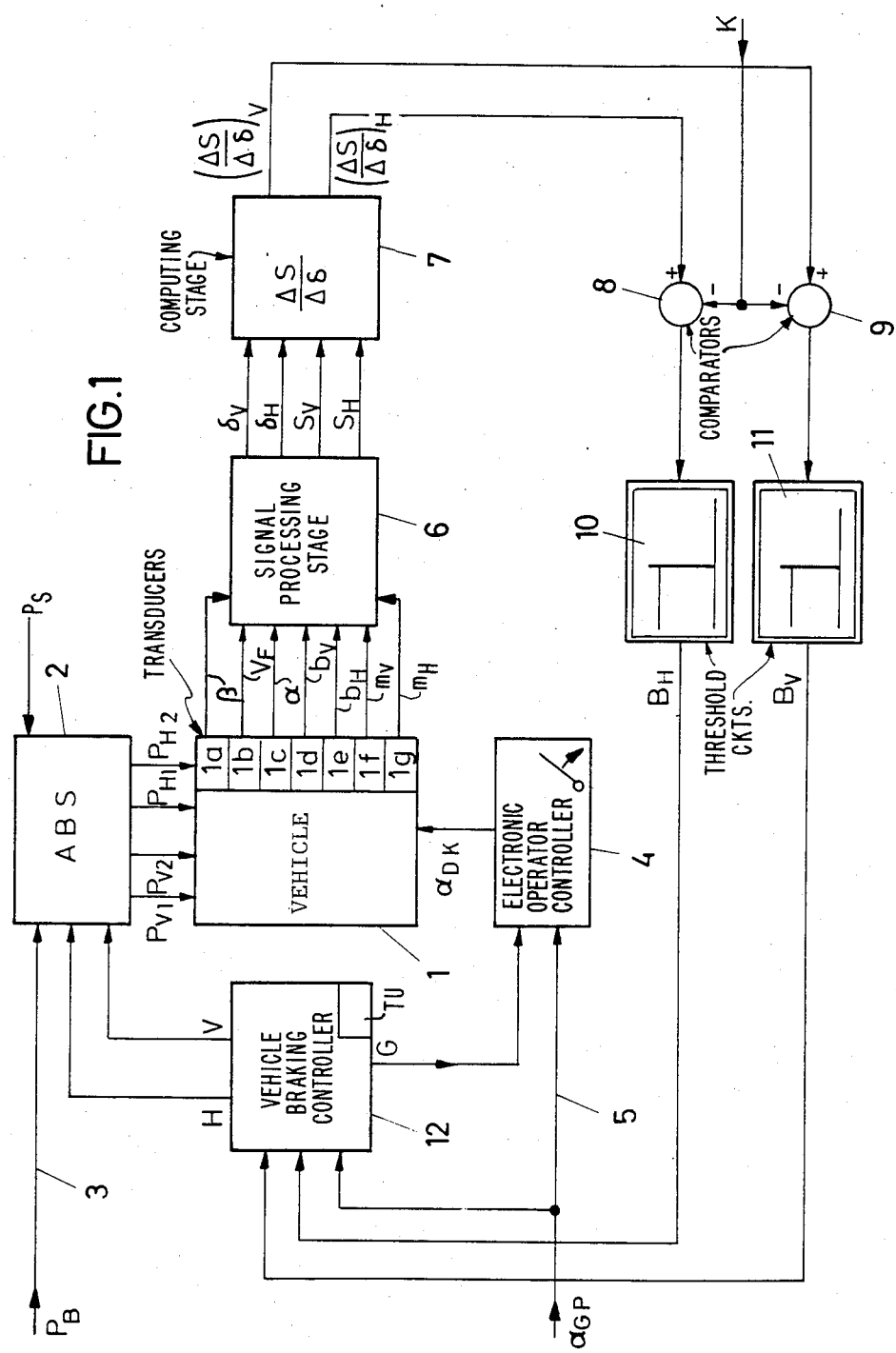
FIG. 1 is a block diagram of the system controlling vehicle speed when operating in a curve.

The control system of FIG. 1 is installed in a vehicle, schematically shown by block 1. The vehicle is equipped with an anti-brake lock system (ABS) 2. Braking pressure, for example hydraulic pressure derived from a source of pressurized hydraulic supply, under control of the vehicle operator, is applied over a line 3, to place an operator controlled braking pressure $P_B$ on the ABS. The ABS receives wheel speed, vehicle speed and similar signals—as well known. It the controlled braking pressure $P_B$ and, in accordance with standard operating mode of an ABS, provides controlled braking pressures $P_{V1}$, $P_{V2}$, $P_{H1}$ and $P_{H2}$ for the brakes of the four wheels of the vehicle. In the discussion hereinafter, the subscript $V$ will be used for the forward wheels of the vehicle and the subscript $H$ for the rear or hind wheels of the vehicle. The vehicle, further, is equipped with an electrical operator controller, in short, a fuel control 4, which converts a deflection position, $\alpha_{GP}$ commanded by an operator, into an electrical signal. This signal controls fuel supply to the vehicle, for example by providing a deflected position $\alpha_{DK}$ representative of a specific deflection of the vehicle throttle plate, and corresponding to a then pertaining deflection position $\alpha_{GP}$ of the gas pedal. The gas pedal position is signalled to the electrical operator controller 4 via a linkage or a control line 5.

A plurality of sensors or transducers are located on the vehicle as follows:

| Transducer | Sensed Parameter |
|---|---|
| 1a | commanded angle of deflection $\beta$ by turning of the steering wheel |
| 1b | vehicle speed $V_F$ |
| 1c | turning or rotary speed $\dot{\alpha}$ of the vehicle about its vertical axis |
| 1d | lateral acceleration $b_V$ at the front axle |
| 1e | lateral acceleration $b_H$ at the rear axle |
| 1f | axle loading at the front axle |
| 1g | axle loading at the rear axle. |

Vehicle speed can be determined, for example, as well known, by processing signals derived from wheel speed sensors associated with the ABS 2. Alternatively, a transducer can be used to measure vehicle speed, for example an acceleration sensor with an integrator, Doppler radar or the like. The turning speed $\dot{\alpha}$ can be measured by use of a gyroscope. Lateral acceleration can be measured by associating acceleration sensors with the respective axles. The vehicle mass can be determined or sensed by sensing the deflection path of the springs of the vehicle axles or, for example, if the vehicle is fitted with an automatic leveling system, typically a hydraulic leveling system, from the respective leveling piston-cylinder arrangements for the respective wheels or axles. The rotary or turning speed $\dot{\alpha}$ need not be measured directly; it is also possible to measure the turning or lateral acceleration and, by integrating, to derive the turning speed $\alpha$. The transduced values, in form of signals, are applied to a block 6 which is a signal processing stage, to derive the lateral forces $F_V$ and $F_H$ and the angles of or later slip $\delta_V$ and $\delta_H$ at the respective front (V) and hind (H) axles.

The lateral forces are determined by the following relationships $$S_V = m_v b_v \quad (1a)$$
$$S_H = m_H b_H$$

Figure 2:
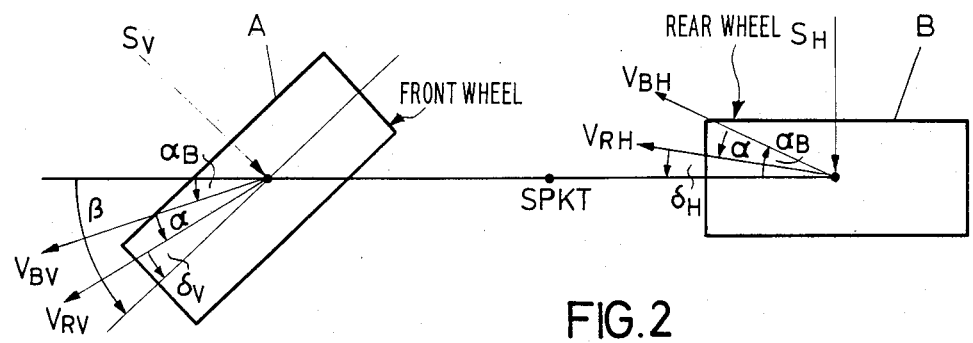
FIG. 2 is a schematic diagram showing the wheels on one side of a vehicle, and including force and speed vectors.

The angles of inclination slip $\delta_V$ and $\delta_H$ are determined as follows (see FIG. 2):

$$\delta_V = \beta - \alpha - \alpha_\beta \quad (2)$$
$$\delta_H = -\alpha - \alpha_\beta$$

wherein
$\alpha_B$ is the angle of the vector of the curve, or angle, in which the vehicle operates
$\beta$ is the commanded angle of deflection of the wheel
$\alpha$ is the rotation angle of the vehicle about a vertical axis The relationships of formula (2) can be readily derived when considering FIG. 2, in which the wheels of one side of the vehicle are indicated at A and B for, respectively, the front and hind wheels. As can be seen, the wheel A has been deflected by the angle $\beta$, as measured, for example, in the sensor or transducer 1a. The wheels are subjected to lateral forces $S_V$ and $S_H$. FIG. 2 shows the center of gravity SPKT of the vehicle, and speed vectors $V_{BV}$ and $V_{BH}$. Additionally, further speed vectors $V_{RV}$ and $V_{RH}$ are shown. These vectors represent:

$V_{RV}$ and $V_{RH}$ resulting wheel speeds at the front and hind wheels respectively
$V_{BV}$ and $V_{BH}$: vehicle speed vectors at the front or rear wheel, in a path curve, without superposition of rotation or turning about a vertical axis.

Figure 3:
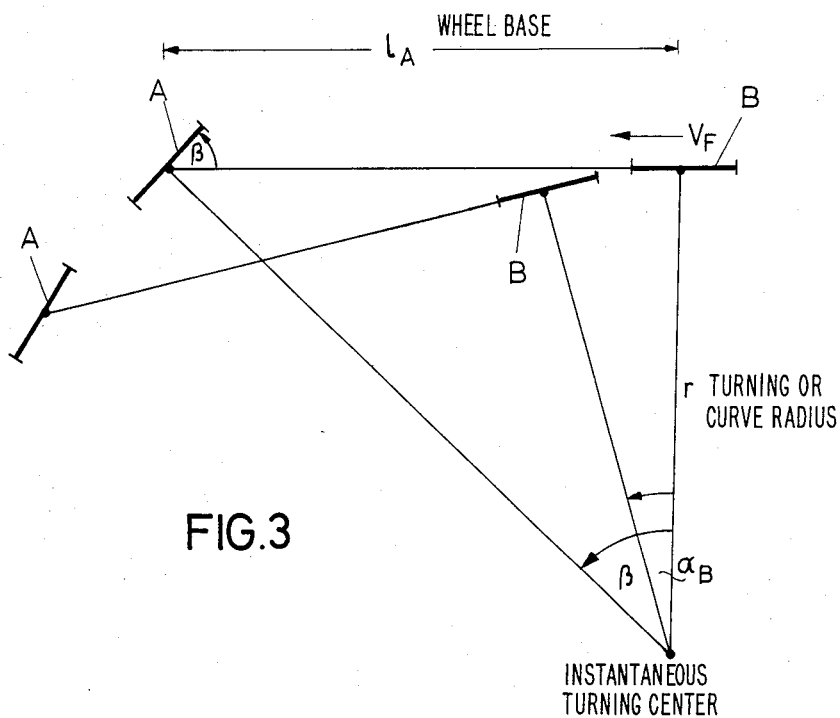
FIG. 3 is a schematic diagram of the wheels of vehicle illustrating the derivation of values used in deriving values explained in the specification.

FIG. 3 shows the position of the wheels in subsequent time intervals $t_1$ and $t_2$. The elapsed time between the intervals $t_1$ and $t_2$ also forms the clock time of the evaluation, mathematically ($t_2 - t_1 = T$) wherein T is the evaluation clock time.

The wheel base is shown as $1_A$, and the radius of the curved path is shown at r. The following relations can then be derived:

$$r = \frac{1_A}{\tan\beta} \text{ and} \quad (3)$$

$$\dot{\alpha}_\beta = \frac{V_F}{r}$$

wherein $V_F$ is the vehicle speed vector;
From which is derived $$\dot{\alpha}_\beta = \frac{V_F}{1_A} \cdot \tan\beta \text{ and} \quad (4)$$

$$\alpha_\beta = \int \frac{V_F}{1_A} \tan\beta \, dt.$$

Substituting in relationship (2):

$$\delta_V = \beta - \int \dot{\alpha} dt - \int \frac{V_F}{1_A} \tan\beta \, dt \text{ and} \quad (5)$$

$$\delta_H = \int \dot{\alpha} dt - \int \frac{V_F}{1_A} \tan\beta \, dt$$

For further consideration, only the change in the lateral step angle is of interest, and one can then formulate:

$$\Delta\delta_V = \beta - \Delta\alpha - \Delta\alpha_\beta \quad (6)$$
$$\Delta\delta_H = -\Delta\alpha - \Delta\alpha_\beta$$

The difference $\Delta\alpha$ between two measuring instants will be:

$$\Delta\alpha = \dot{\alpha}_{(t+T)} - \dot{\alpha}_{(t)} = \frac{(\dot{\alpha}_{(t+T)} + \dot{\alpha}_{(t)}) \cdot T}{2} \quad (7)$$

At the last derivation, the trapezoidal conversion rule was used; and t represents any one instant of time, e.g. $t_1, t_2 \ldots$; and $T$ is the clock time interval.

It can be assumed that, within the clock interval T, the values $\beta$ and $V_F$ are constant. Then:

$$\Delta\alpha_\beta = \alpha_\beta(t + T) - \alpha_\beta(t) = \frac{V_F}{1_A} \cdot \tan\beta \cdot T \quad (8)$$

The values $S_V$, $S_H$ and $\Delta\delta_V$ and $\Delta\delta_H$ are then applied to a stage 7, which is a computing stage. Stage 7, in accordance with well known arithmetic calculation, and considering the lateral forces with respect to a predetermined time instant, that is, before the time T, calculates the quotients $$\frac{\Delta_S}{\Delta \delta_V} \text{ and } \frac{\Delta_S}{\Delta \delta_H} \qquad (9)$$

These quotients are formed for the two axles V and H, independently.

The quotients determined in accordance with the relationship (9) are then applied to comparators 8 and 9. The comparators have the value K applied. The value K may be considered a constant value, but it may be variable, for example depending on vehicle operation or operating conditions or parameters.

Figure 4:
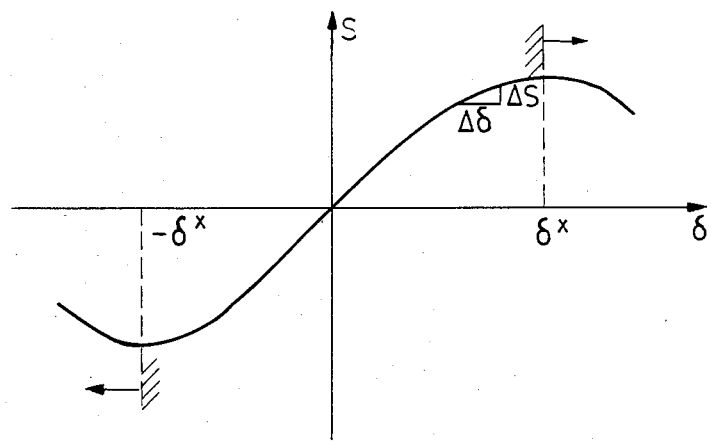
FIG. 4 illustrates lateral forces as a function of slip angle.

FIG. 4 illustrates the relationship between lateral forces S with respect to the lateral slip angle of, or the angle $\delta$ of the actual path of the wheel with the commanded or rolling path. As can be seen, the lateral forces rise, starting from zero, and then drop after a value of $\delta_x$. This relationship also clearly shows that the regions beyond $\delta_x$ and $-\delta_x$ are unstable. Thus, control must be carried out in the range between $-\delta_x$ and $+\delta_x$. Consequently, $$\frac{\Delta S}{\Delta \delta} \geq 0. \qquad (10)$$

If it is considered that, as the result of the control to be effected, the vehicle should be retarded or decelerated, a braking force is also applied in the longitudinal direction on the road surface. The longitudinal axis of the vehicle is shown in FIG. 2, schematically, by the line passing through the center of gravity SPKT and connecting the turn centers of the front and rear wheels A and B. In accordance with the well known course of the stability limit upon transfer of longitudinal and transverse forces, the relationship (10) above may not be zero, or close to zero; it may have a value of $K>0$, that is, a value to be determined.

If K is passed, for example by being passed below its value, threshold circuits 10, 11 will respond and generate a switching signal $B_V$ and $B_H$, respectively. These switching signals are applied to a vehicle braking controller 12. Vehicle braking controller 12 is connected to the ABS 2, which permits application of braking pressure to the respective wheels or axles—as will appear below—from a pressurized source of braking fluid, schematically shown by arrow $P_S$. Thus, the vehicle will be braked. In addition, the vehicle braking controller is connected via terminal G to the electrical operator controller 4, for example independently or additionally, selectively decreasing fuel supply and thus decreasing engine torque—or otherwise controlling the engine to decrease output torque. The vehicle braking controller 12 includes a timing unit, schematically shown as TU in order to, for example, sequentially control various effects. The following illustrates possibilities which, independently or together, can be used to retard or decelerate the vehicle, in accordance with a simple control program retained, for example, within the vehicle braking controller 12:

(a) Controlled braking is effected by applying vehicle brakes. Upon braking, the driven axle will be subjected to partial blocking of the differential or differential effect. No output signal is applied to terminal G, that is, engine output torque is not affected.

(b) First, and at a first timing interval, as determined by the timing unit TU, the engine torque is reduced; thereafter, the ABS 2 is caused to become operative by energizing the output terminals H, V, to provide for controlled braking. The engine torque can be reduced, under controlled conditions, that is gradually or faster, in accordance with the degree of deviation of the quotient derived from the computing stage 7 with respect to the constant K.

(c) Both axles are braked under controlled conditions by the ABS 2 when either a signal $B_V$ or $B_H$ is present. The ABS prevents wheel blocking and excessive braking.

(d) The wheels at the front or forward axle and the wheels at the hind or rear axle are separately braked. The axle, at which the wheels are in non-critical condition, are braked with greate braking effort than the axle which has reached or is about to reach critical conditions. Different values of $B_V$ and $B_H$ must then be evaluated in the vehicle braking controller; this can be instrumented very simply, for example by a comparator or, additionally, comparison with the level of deviation from the value K as determined in the comparators 8, 9.

(e) The ABS provides braking effort only to the wheels at the axle which is not under critical or incipiently critical condition.

Various combinations of the conditions (a), (b) with (c), (d), (e) are possible. One suitable combination is (b)+(e). Additional ways to influence the respective wheels are given in the table attached hereto. In the table, $B_V$ and $B_H$ are representative of the signals applied to the vehicle braking controller 12. $\alpha_G$ is the signal generated by the electrical operator controller, that is, by the gas pedal. V, H and G are the limiting effects or limiting values to which the braking pressures P at the forward and rear wheels, and the deflection of the throttle G are, respectively, subjected.

Figure 5:
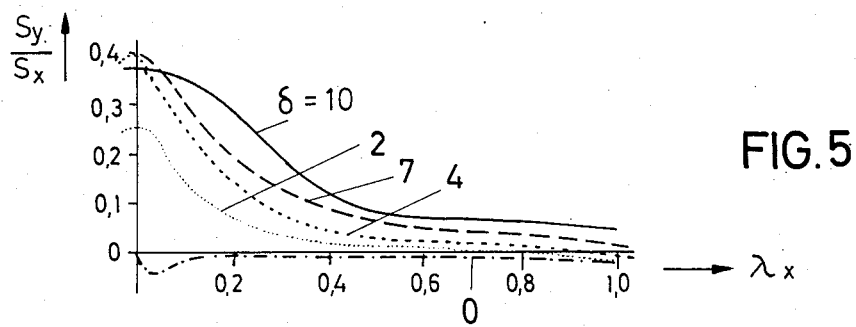
FIG. 5 is a diagram illustrating lateral force Sy as a function of longitudinal slippage $\lambda_x$.
Figure 6:
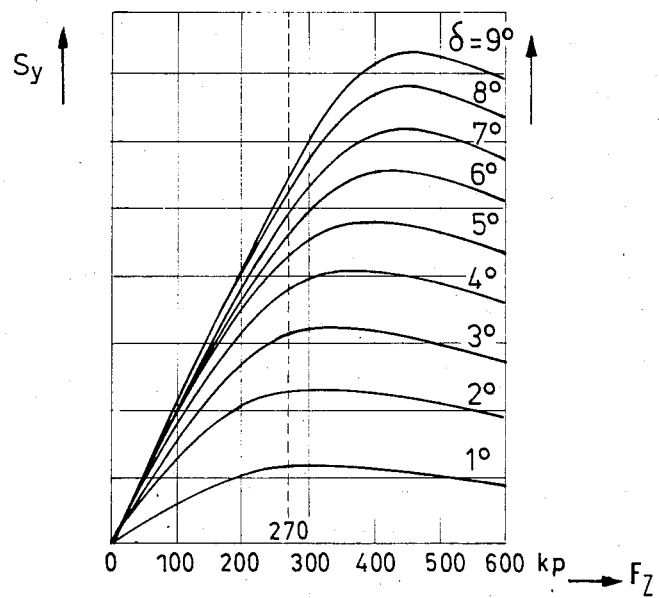
FIG. 6 illustrates a lateral force Sy as a function of wheel loading $F_Z$ in kiloponds (kilogram-mass).

FIG. 5 illustrates the relationship of longitudinal slippage $\lambda_x$ to the ratio of lateral force $S_Y$ with respect the longitudinal force $S_X$ related to the inclination angle or turn or inclination running angle $\delta$. As can be clearly seen, as the angle $\delta$ increases, the lateral forces, with a given longitudinal force, will increase. FIG. 6 also shows this relationship. Further, the lateral force $S_Y$ increases with wheel loading $F_Z$ within the range of interest, as also clearly seen in FIG. 6.

The value K can depend on operating or operation conditions of the vehicle and on the vehicle characteristics themselves. If only engine torque is to be controlled, it is desirable to use in the relationship (10) a lower value for K than if braking, for example by the ABS 2, also is controlled.

In the description and in the claims of this application the expression "lateral slip angle" is used for the angles $\delta_V$ and $\delta_H$. The meaning of these angles can be taken from formula (2) and from FIG. 2. The anle $\delta_H$ is the angle between the direction of the base of the wheel and the vector of the actual wheel-speed $V_{RH}$ of the rear wheel. The angle $\delta_V$ is the angle between a line being normal to the axle of the steered wheels and the vector of actual wheel-speed $V_{RV}$ of the steered wheels.

TABLE

| Conditions | | | Limiting Effects | | |
|---|---|---|---|---|---|
| $B_V$ | $B_H$ | $\alpha_G$ | V | H | G |
| 0 | 0 | 0 | 0 | 0 | $\alpha_{max}$ |
| 0 | 0 | $\neq 0$ | 0 | 0 | $\alpha_{max}$ |
| 0 | 1 | 0 | 1 | 0 | 0 |

TABLE-continued

| Conditions | | | Limiting Effects | | |
|---|---|---|---|---|---|
| $B_V$ | $B_H$ | $a_G$ | V | H | G |
| 0 | 1 | ≠0 | 0 | 0 | 0 |
| 1 | 0 | 0 | 0 | 1 | 0 |
| 1 | 0 | ≠0 | 0 | 0 | 0 |
| 1 | 1 | 0 | 1 | 1 | 0 |
| 1 | 1 | ≠0 | 0 | 0 | 0 |

I claim:

1. Speed control system for a motor vehicle, to control the speed of operation of the vehicle when the vehicle operates in a curved path, comprising lateral force sensing means (1d, 1e) secured to the vehicle for sensing lateral forces ($S_V$, $S_H$) and deriving sensed lateral force signals;

means receiving said lateral force signals for determining change in lateral forces ($\Delta S_V$, $\Delta S_H$) with respect to time and deriving lateral force change signals;

means (1a, 1b, 1c) for determining the slip angle ($\delta_V$, $\delta_H$) of the vehicle, as the vehicle operates in the path which is curved and deriving a slip angle signal;

means coupled to said slip angle determination means (1a, 1b, 1c) for determining the change of the slip angle and deriving a slip angle change signal;

quotient deriving means (7) coupled to said change in lateral force sensing means and said slip angle change signal deriving means, and receiving said lateral force change signals and said slip angle change signals ($\Delta S_V/\Delta \delta_V$, $\Delta S_H/\Delta \delta_H$) for at least one of said front and rear wheels, respectively;

to obtain a quotient signal representative of the quotient of the lateral force change signals and said slip angle change signals;

comparator means (8) coupled to said quotient deriving means (7) receiving said quotient signal and comparing said quotient signal with a predetermined reference value (K) and deriving a comparison output signal; and means (12, 2, 4) responsive to said comparison output signal for controlling the speed of the vehicle if the comparison output signal derived from said comparator means (8) is indicative that said quotient has passed the predetermined reference value.

2. The system of claim 1, wherein said means (12, 2) for controlling the speed of the vehicle comprises means (2; ABS) for braking the vehicle.

3. The system of claim 1, wherein said means (12, 4) for controlling the speed of the vehicle comprises means (4) for controlling a vehicle engine to reduce torque output of the engine.

4. The system of claim 1, wherein said means (12, 2, 4) for controlling the speed of the vehicle comprises means (2; ABS) for braking the vehicle; and means (4) for controlling a vehicle engine to reduce torque output of the engine.

5. The system of claim 1, wherein said predetermined reference value (K) comprises a variable reference value.

6. The system of claim 5, wherein said predetermined reference value comprises a value dependent on vehicle operation or operating conditions.

7. The system of claim 3, wherein said means (12, 4) for controlling the speed of the vehicle comprises means (4) for controlling a vehicle engine to reduce torque output of the engine as said means for controlling the speed of of the vehicle.

8. The system of claim 2, wherein the quotient deriving means (7) derive quotient signals representative of the quotient of the lateral force angle signals and the slip angle signals with respect to both the forward and rear or hind axles of the vehicle;

and wherein said brake means apply braking effort to the wheels of the respective forward and rear axles as a function of the magnitude by which the quotient determined for the respective axle passes said predetermined reference value (K).

9. The system of claim 8, wherein said brake means apply braking effort only to wheels of the axle at which the quotient does not pass the reference value (K).

10. The system of claim 8, wherein said brake means apply braking effort to the wheels of both the forward and the rear or hind axle; and wherein the braking effort applied to the wheels of the axle at which one of said quotients has passed the reference value is braked less than the wheels at which the other quotient has not passed said reference value (K).

11. The system of claim 10, wherein the degree of braking effort applied by said brake means is related to the magnitude by which said other quotient passes said reference value; and wherein the wheels of the axle in which said reference value is passed by a greater extent are braked less and the wheels on which said reference value is passed by a lesser extent have a higher braking effort applied.

12. The system of claim 1, wherein the means (12, 2, 4) for controlling the speed of the vehicle includes an anti-brake lock system (ABS, 2).

13. The system of claim 1, including means (1f, 1g) for sensing axle loading of the forward and rear or hind axles and providing axle load signals;

wherein said lateral force sensing means includes means (1d, 1e) for sensing transverse acceleration ($b_V$, $b_H$) at the forward and rear or hind axles and deriving transverse acceleration signals;

calculating means (6, 7) are provided, responsive to said axle load signals, derived from said axle load sensing means and further responsive to said transverse acceleration signals, derived from said transverse acceleration sensing means, and said calculating means calculating lateral forces ($S_x$, $S_y$) based on said transverse acceleration and axle load signals.

14. The system of claim 1, further including means (1a) for measuring the deflection angle ($\beta$) of the steered wheels, and means (1c) for sensing the turning angle ($\alpha$) about a vertical axis of the vehicle, and for determining the angle of the car track vector ($\alpha_B$), each said deflection angle measuring means and turning angle sensing means providing an output signal;

and wherein said means for determining said angle of slip comprise calculating means (6, 7) coupled to said deflection angle measuring means and the turning angle sensing means, and calculating the slip angle ($\delta_V$, $\delta_H$) as a function of said output signals of said deflection angle measuring means and said turning angle sensing means.

15. The system of claim 14, wherein said means (1c) for sensing the slip angle comprises means for sensing turning speed ($d\alpha/dt$) and means (6) for integrating said turning speed for a predetermined time interval.

16. The system of claim 14, further comprises a means for determining the angle of the track car vector ($\alpha_B$) based on $$\frac{V_F}{l_A} \cdot \tan\beta$$

wherein
$V_F$ is vehicle speed,
$l_A$ is the wheel base of the vehicle, and
$\beta$ is the angle of deflection of the forward or steered wheel with respect to the vehicle axis.

17. The system of claim 1, wherein said means for determining the change of the angle of lateral slip ($\Delta\delta_V, \Delta\delta_H$) includes means (1a) for sensing the change of the deflection angle ($\Delta\beta$) of the steered wheels and means for determining the changes of the rotation angle ($\Delta\alpha$) of the vehicle about a vertical axis, and a track angle ($\Delta\alpha\beta$), in which the vehicle operates with respect to sequential measuring instants ($t_1, t_2$), said sequential measuring instants following each other by predetermined measuring intervals.

18. The system of claim 17, wherein means (1c) are provided for sensing the turning speed ($d\alpha/dt$) at a first instant of time ($t_1$) and subsequently measuring the turning speed $d\alpha/dt_{(t1+T)}$, and wherein the change of said rotation angle ($\Delta\alpha$) is derived by sensing the deviation between the first and subsequently measured turning speed, to thereby determine said change of said rotation angle.

19. The system of claim 17, wherein said change of curve angle ($\Delta\delta_\beta$) is derived in accordance with the relationship:

$$\Delta\alpha_\beta = \frac{V_F}{l_A} \cdot \tan\beta \cdot T$$

wherein
$V_F$ is the vehicle speed,
$l_A$ is the wheel base of the vehicle,
$\beta$ is the angle of deflection of the forward or steered wheel with respect to the vehicle axis.

20. The system of claim 1, wherein means (2) are provided for furnishing signals representative of rotary speed of the respective wheels of the vehicle and including means for determining the vehicle speed ($V_F$) based on said furnished signals.

21. Speed control system for a motor vehicle, for controlling the speed of operation of the vehicle when operating in a curved path, comprising
lateral force sensing means (1d, 1e) secured to the vehicle (1) for sensing lateral forces ($S_V, S_H$);
means (1a, 1b, 1c) for determining the lateral slip angle ($\delta_V, \delta_H$) of the vehicle, as the vehicle operates in a path which is curved;
means for determining the change in forces acting on the vehicle based on said lateral forces and said lateral slip angle as the vehicle operates in a curved path; and
means for reducing the speed of the vehicle if the change in forces acting on the vehicle as it moves in a curved path indicates a tendency of the vehicle to veer off a steered course.

22. The system of claim 21, further including means (1a) for measuring the deflection angle ($\beta$) of the steered wheels, and means (1c) for sensing the turning angle ($\alpha$) about a vertical axis of the vehicle, and for determining the angle of the car track vector ($\alpha_B$), each said deflection angle measuring means and turning angle sensing means providing an output signal;
and wherein said means for determining said angle of slip comprise calculating means (6, 7) coupled to said deflection angle measuring means and the turning angle sensing means, and calculating the slip angle ($\delta_V, \delta_H$) as a function of said output signals of said deflection angle measuring means and said turning angle sensing means.

23. The system of claim 21 including
quotient deriving means (7) coupled to said lateral force sensing means and to said lateral slip angle determining means and deriving a quotient of lateral force, with respect to the slip angle, acting on the vehicle as the vehicle operates in a curved path, said quotient being representative of the relationship of said lateral force and said lateral slip angle;
and wherein said means for determining the change in forces acting on the vehicle as the vehicle operates in a curved path comprises means for determining the change in the quotient derived by said quotient deriving means.

24. Speed control system for a motor vehicle, for controlling the speed of operation of the vehicle when operating in a curved path, comprising
sensing means secured to the vehicle for sensing change in lateral forces ($\Delta S_V, \Delta S_H$) with respect to time;
means for determining the change of the angle of lateral slip ($\Delta\delta_V, \Delta\delta_H$) as the vehicle operates in a path which is curved;
quotient deriving means (7) coupled to said lateral forces change sensing means and to said lateral slip angle change determining means and deriving a changing quotient representative of the change in lateral forces and the change of the angle of lateral slip, and deriving a signal representative of the change of said quotient; and
means (12, 2, 4) for reducing the speed of the vehicle if the change in said quotient reaches a critical limit indicative of a tendency of the vehicle to veer off a given course.

25. The system of claim 24, wherein the means for determining the change of the lateral slip angle includes means (1a) for sensing the change of the deflection angle ($\Delta\beta$) of the steered wheels and means for determining the change of the rotation angle ($\Delta\alpha$) of the vehicle about a vertical axis, and the change of the vector of the curve angle ($\Delta\alpha\beta$) in which the vehicle operates with respect to sequential measuring instants ($t_1, t_2$), said sequential measuring instants following each other by predetermined measuring intervals.

* * * * *